US012695672B2

(12) United States Patent
Nästén et al.

(10) Patent No.: US 12,695,672 B2
(45) Date of Patent: Jul. 28, 2026

(54) MANAGEMENT OF LARGE-SCALE NETWORKS

(71) Applicant: Cisco Technology, Inc., San Jose, CA (US)

(72) Inventors: Claes Daniel Nästén, Bureå (SE); Erdem Aksu, Stockholm (SE); Viktória Fördös, Värmdö (SE)

(73) Assignee: Cisco Technology, Inc., San Jose, CA (US)

( * ) Notice: Subject to any disclaimer, the term of this patent is extended or adjusted under 35 U.S.C. 154(b) by 34 days.

(21) Appl. No.: 18/791,871

(22) Filed: Aug. 1, 2024

(65) Prior Publication Data

US 2026/0039557 A1     Feb. 5, 2026

(51) Int. Cl.
*G06F 15/173*     (2006.01)
*H04L 41/12*      (2022.01)
*H04L 43/08*      (2022.01)

(52) U.S. Cl.
CPC .............. *H04L 41/12* (2013.01); *H04L 43/08* (2013.01)

(58) Field of Classification Search
None
See application file for complete search history.

(56) References Cited

U.S. PATENT DOCUMENTS

2014/0115569 A1     4/2014   Jung
2014/0325363 A1*   10/2014   Fletcher .................. H04L 41/22
                                                          715/736
2018/0096017 A1     4/2018   Dean et al.

FOREIGN PATENT DOCUMENTS

CN        112667935 A      4/2021
CN        116017561 A      4/2023
CN        117311901 A     12/2023

* cited by examiner

*Primary Examiner* — Padma Mundur
(74) *Attorney, Agent, or Firm* — Lee & Hayes, P.C.

(57)     ABSTRACT

In one embodiment, a method for management of large-scale networks includes receiving, by a network orchestrator, a request for performance of a data operation and performing, by the network orchestrator, a lookup operation corresponding to a specific data node in a computer network in response to receiving the request. The method can further include enqueuing, by the network orchestrator, a background loading operation involving a network configuration tree that includes one or more children nodes associated with the specific data node in response to initiating performance of the lookup operation and executing, by the network orchestrator, the lookup operation using the network configuration tree.

20 Claims, 7 Drawing Sheets

PERSISTENT STORAGE TABLE 520

| KEYS |
|------|
| /A |
| /A/B |
| /A/B/K |
| /A/B/L |
| /A/B/M |
| /A/C |
| /A/C/D |
| /A/C/D/X |
| /A/C/D/Y |
| /A/C/D/Z |
| /A/C/E |
| /A/C/F |

IN-MEMORY TREE 510

500

LOADED NODE 512

NOT LOADED NODE 514

INSERTED LINK 516

NON EXISTENT LINK, TO BE INSERTED ON LOAD 518

MANAGEMENT OF LARGE-SCALE NETWORKS

TECHNICAL FIELD

The present disclosure relates generally to computer networks, and, more particularly, to management of large-scale networks.

BACKGROUND

In recent years, networks have grown both in terms of size and in terms of complexity. For example, more and more network devices have been added to modern networks, in turn increasing the size and complexity of such networks, and this trend is expected to continue in the future. In addition, contemporary network devices (routers, switches, etc.) offer increasingly fine-grained control over their vast feature set via their configuration parameters, further increasing the complexity of networks.

From the perspective of a network service orchestrator (or "network orchestrator" for brevity) the implications of the increase in size and complexity of networks are twofold: (1) there are more devices in a network to manage, and (2) the size of configuration per device is larger. These can lead to organizations requiring larger machines (in terms of computing resources, such as memory resources, processing resources, etc.) to host their network service orchestrator to satisfy these increasing computing resource requirements.

Larger machines use more energy and have higher operating costs. At odds with this, however, is the increasing desire of organizations, by their own initiative or by regulatory reasons, to run "Green IT," a paradigm which seeks to reduce energy footprint and operating costs associated with networks and other computing devices. Unfortunately, solving this seeming paradox in which organizations can run "Green IT" yet at the same time allow their networks to operate in line with organization and customer expectations, is difficult.

BRIEF DESCRIPTION OF THE DRA WINGS

The embodiments herein may be better understood by referring to the following description in conjunction with the accompanying drawings in which like reference numerals indicate identically or functionally similar elements, of which:

DESCRIPTION OF EXAMPLE EMBODIMENTS

Overview

According to one or more embodiments of the disclosure, a method for management of large-scale networks includes receiving, by a network orchestrator, a request for performance of data operation and performing, by the network orchestrator, a lookup operation corresponding to a specific node in a computer network in response to receiving the request. The method can further include enqueuing, by the network orchestrator, a background loading operation involving a network configuration tree that includes one or more children nodes associated with the specific node in response to initiating performance of the lookup operation and executing, by the network orchestrator, the lookup operation using the network configuration tree.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computing system.
Figure 1:
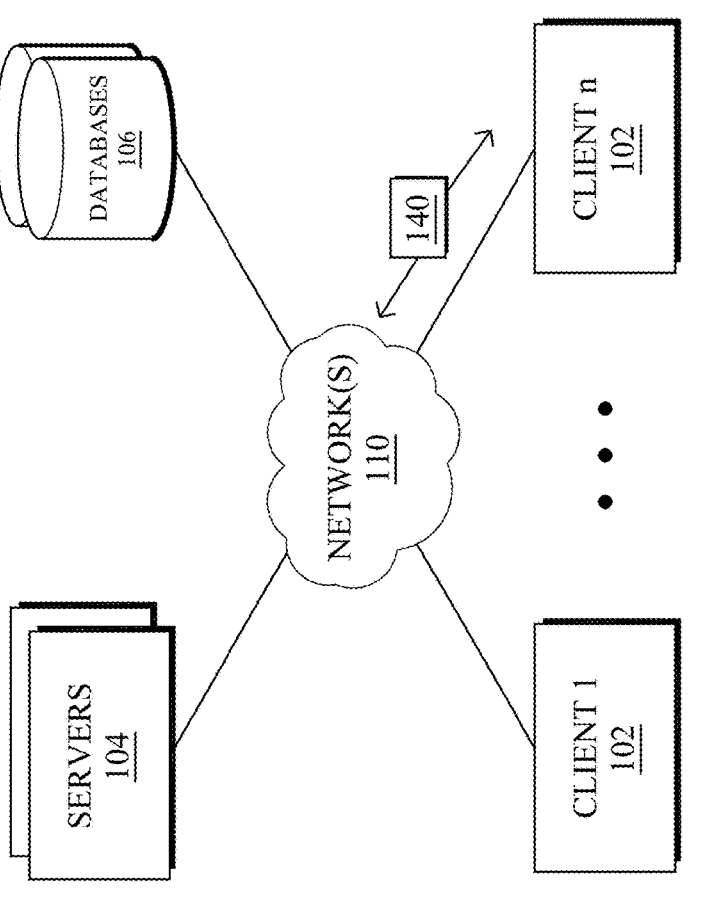

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
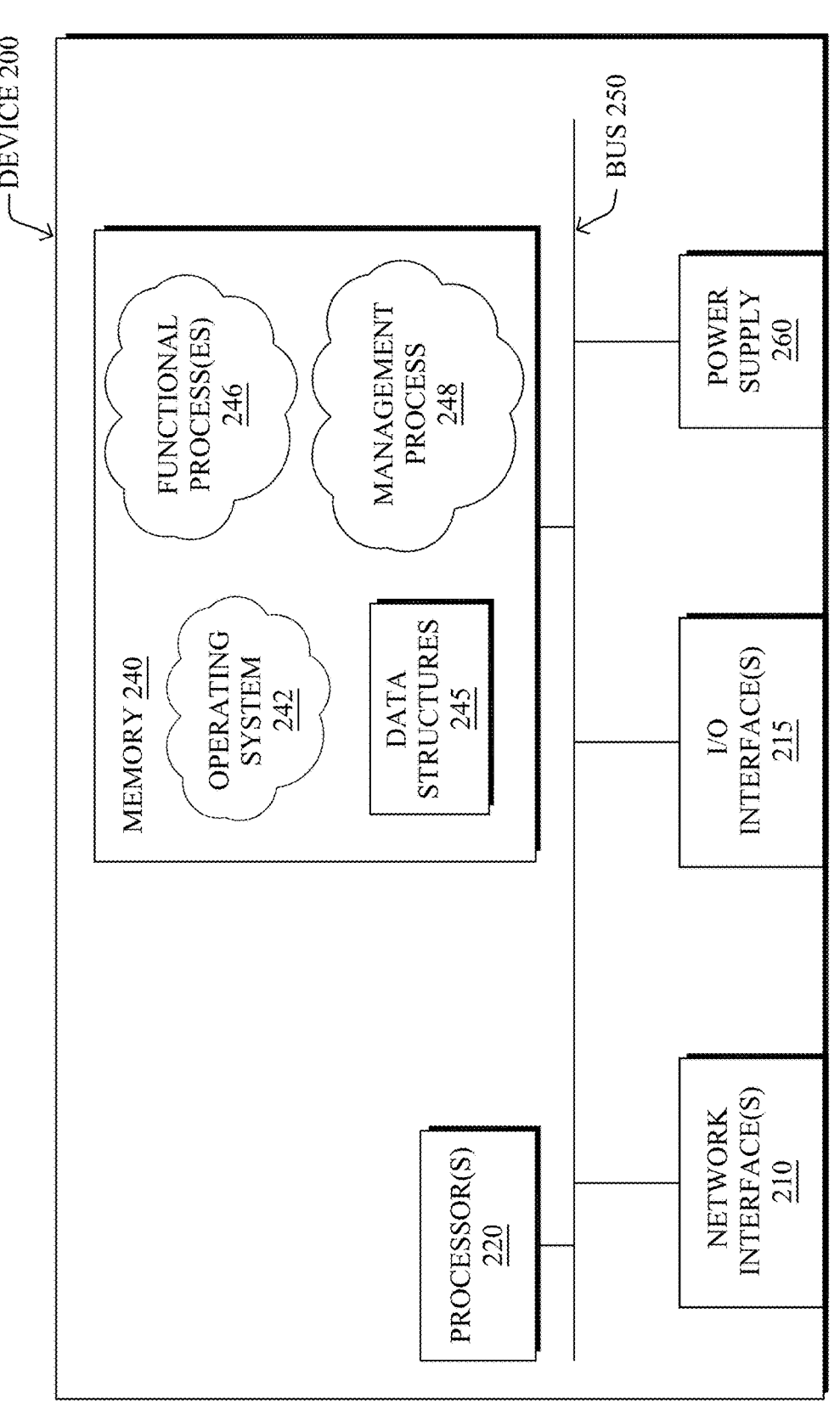
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a management process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

For instance, one or more functional processes 246 may include computer executable instructions executed by the processor(s) 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, the one or more functional processes 246 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, one or more functional processes 246 and/or management process cess (process 248) may include computer executable instructions that, when executed by processor(s) 220, cause device 200 to perform the techniques described herein. To do so, in some implementations, one or more functional processes 246 and/or process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, one or more functional processes 246 and/or process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that one or more functional processes 246 and/or process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, one or more functional processes 246 and/or process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, one or more functional processes 246 and/or process 248 may use a generative model to generate synthetic network traffic based on existing user traffic to test how the network reacts. Example generative approaches can include, but are not limited to, generative adversarial networks (GANs), large language models (LLMs), other transformer models, and the like. In some instances, one or more functional processes 246 and/or process 248 may be executed to intelligently route LLM workloads across executing nodes (e.g., communicatively connected GPUs clustered into domains).

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

—Management of Large-Scale Networks—

As noted above, in recent years, networks have grown both in terms of size and in terms of complexity. For example, more and more network devices have been added to modern networks, in turn increasing the size and complexity of such networks, and this trend is expected to continue in the future. In addition, contemporary network devices (routers, switches, etc.) offer increasingly fine-grained control over their vast feature set via their configuration parameters, further increasing the complexity of networks.

As also noted above, from the perspective of a network service orchestrator (or "network orchestrator" for brevity), such as NSO by Cisco® Systems, Inc., the implications of the increase in size and complexity of networks are twofold: (1) there are more devices in a network to manage, and (2) the size of configuration per device is larger. These can lead to organizations requiring larger machines (in terms of computing resources, such as memory resources, processing resources, etc.) to host their network service orchestrator to satisfy these increasing computing resource requirements.

Furthermore, as mentioned previously, larger machines use more energy and have higher operating costs. At odds with this, however, is the increasing desire of organizations, by their own initiative or by regulatory reasons, to run "Green IT," a paradigm which seeks to reduce energy footprint and operating costs associated with networks and other computing devices. Unfortunately, solving this seeming paradox in which organizations can run "Green IT" yet at the same time allow their networks to operate in line with organization and customer expectations, is difficult, and today there is no straightforward solution to this contradiction.

For example, network service orchestrators handling YANG modeled data or other modeling languages with similar properties, have specific requirements towards the data layer as follows. YANG schema order has more importance than one may think from the first glance. One implication of this is that well-formed southbound communication towards the network devices and correctness of configuration changes may depend on this schema order and respecting the order of entries in an access control list can be essential to proper operation of the network. Another example of the importance of YANG schema order occurs in southbound diff generation for command line interface (CLI) devices, as will be appreciated by those skilled in the art. It is noted that implementations are not limited to CLI devices, however, and other device types, such as NET-CONF, REST, gnmi, and so on and so forth are contemplated within the scope of the disclosure. Dependencies among consecutive CLI commands must be honored to have the CLI device accept and correctly interpret the configuration change. Unfortunately, currently there is no native XML datastore that is able to keep the schema order and enforce YANG schema constraints, despite its importance in networks.

In general, YANG schema constraints express correctness requirements towards the network device configuration. A non-limiting example of YANG Schema constraints may include constraints where the active VLAN ID must point to an existing, enabled interface on a device in the network. In such implementations, these active VLAN ID can be directly given as and/or translated to XPath expressions in the YANG modelling language. That is, in the case of a "must" expression (e.g., the interface is enabled) and a leafref node (e.g., the VLAN ID points to an existing interface), these constraints are neither evaluated nor enforced by any native XML datastore.

Further, network orchestrators generally are required to handle persistent and volatile operational data together with device configurations. Several non-limiting examples of operational data are (1) live-status information (e.g., CPU load on a network device), (2) alarms (e.g., device x is unreachable), and (3) other events (e.g., telemetry events delivered as YANG push notifications). Operational data can also be modelled in YANG and can be placed below any configuration node. As operational data can have a different lifecycle than configurational data, they each can require special handling on the data layer that is not provided by any native XML datastore.

These and other requirements can render currently available XML databases insufficient for inclusion in a network service orchestrator. This can, in turn, leave the network service orchestrator with one choice: use a naive data layer where all data is kept in memory. This requirement leads to scenarios where, if an organization wants to have a network service orchestrator with great throughput characteristics, the organization must accept that its host requirements grow with their network, which is clearly at odds with the desire to run "Green IT."

In order to alleviate the foregoing issues, solutions that ensure that the network service operator keeps its throughput characteristics while it minimizes its memory consumption are disclosed herein.

That is, the techniques herein provide methodologies in which memory usage of the network service orchestrator is minimized without compromising its correctness and throughput characteristics. These techniques can enable large customer site network installations to perform operations efficiently, while reducing their energy footprint and their operational costs.

Specifically, according to one or more embodiments of the disclosure as described in detail below, a method for management of large-scale networks includes receiving, by a network orchestrator, a request for performance of a data operation and performing, by the network orchestrator, a lookup operation corresponding to a specific node in a computer network in response to receiving the request. The method can further include enqueuing, by the network orchestrator, a background loading operation involving a network configuration tree that includes one or more children nodes associated with the specific node in response to initiating performance of the lookup operation and executing, by the network orchestrator, the lookup operation using the network configuration tree.

Figure 3:
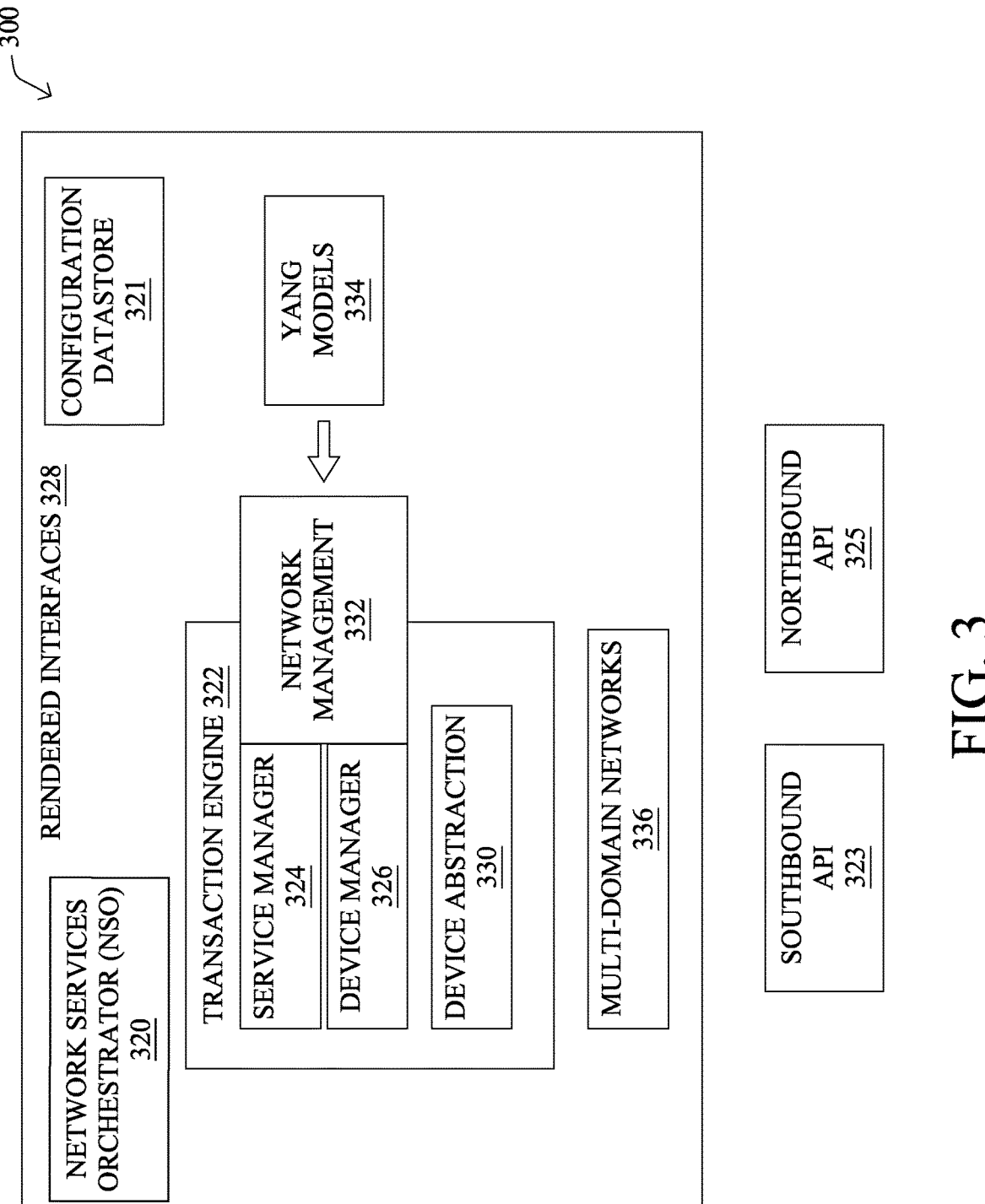
FIG. 3 illustrates an example system for management of large-scale networks.

Operationally, FIG. 3 illustrates an example system for management of large-scale networks. As shown in FIG. 3, system 300 includes a network orchestrator 320, a transaction engine 322, which includes a service manager 324 and a device manager 326, rendered interfaces 328, a device abstraction layer 330, and a network management tool 332. The network management tool 332 can receive models (e.g., the YANG models 334) as part of performing the operations described herein. In addition, as illustrated in FIG. 3, the system 300 can include multi-domain networks 336.

Further, the system 300 includes a configuration datastore 321, which can be configured to store various configuration information for one or more networks. In addition, the system 300 may include a southbound API 323 and a northbound API 325. It will be appreciated that the southbound API 323 can allow for a higher-level component to send commands to lower-level network components, such as network devices, connected user devices, etc., while the northbound API 325 can allow for a lower-level network component to communicate with a higher-level or more central component, such as the network orchestrator 320, the transaction engine 322, etc.

In some implementations, the network orchestrator 320 (e.g., Crosswork Network Service Orchestrator (NSO) by Cisco® Systems, Inc. or other suitable network orchestrator) can provide automation to design, implement, and validate network services, which can result in network configuration changes. The network orchestrator 320 can manage configuration data, including service and device configuration data, which, as mentioned above can grow in size linearly with respect to the size of the network in which the network orchestrator 320 is running.

As shown in FIG. 3, the network orchestrator 320 includes a network management tool 332 that can be configured to manage network configurations. In some implementations, data corresponding to the network configurations can be provided as a model or models, such as the YANG models 334, although it will be appreciated that model(s) in other languages are supported by the network management tool 332 in accordance with the disclosure.

In some implementations, the network management tool 332 can be analogous to a native XML datastore, although implementations are not limited to this particular illustrative datastore. In general, the data corresponding to the network configurations is written to system memory in order for the network orchestrator 320 to manage and/or push network configurations with an expected level of throughput.

As a result, with a naïve approach where a network service orchestrator keeps all the network data in memory, the hardware requirements of the host machines increase. Further, in current approaches, a common practice is horizontal scaling (i.e., assigning the network devices to multiple network service orchestrators), which results in additional operational costs and additional energy consumption. However, implementations described herein make use of the observation that intent-based and ad-hoc configuration changes read and write only a fraction of network configuration data regardless of the size of the data model of network devices.

Figure 4:
FIG. 4 illustrates another example system for management of large-scale networks that implements a read-through mechanism.
Figure 4:
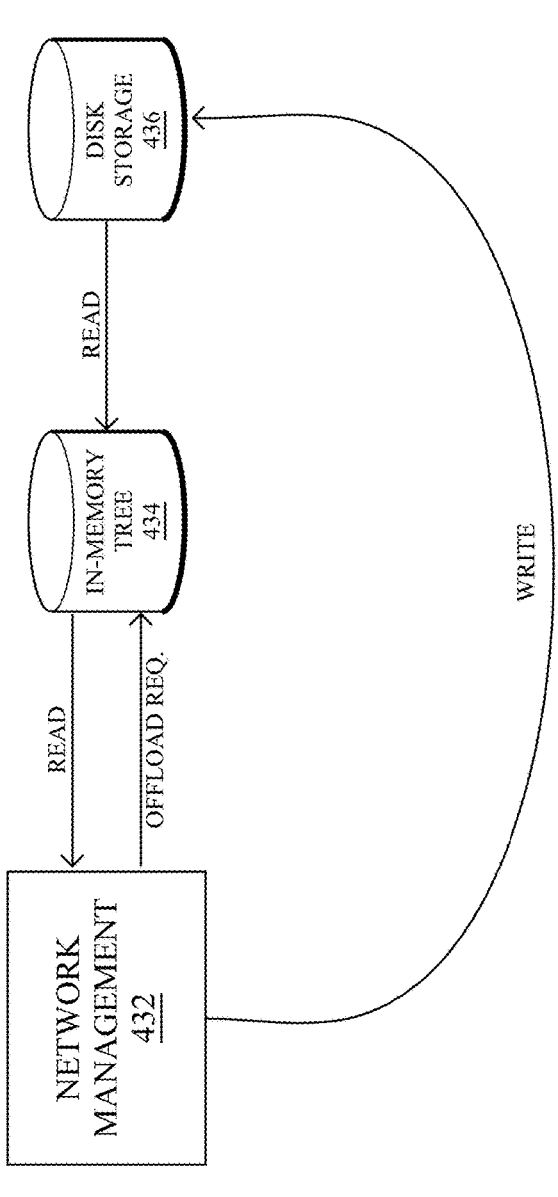

As will be discussed in more detail below, aspects of the disclosure utilize a network orchestrator 320 that may illustratively include:

A configuration datastore (e.g., the configuration datastore 321);

A persistent storage (e.g., the disk storage 436 of FIG. 4);

A data layer (e.g., an in-memory tree representation of the persistent storage, such as the in-memory tree 434 of FIG. 4);

A transaction manager (e.g., the transaction engine 322); and

A southbound and northbound API (e.g., the southbound API 323 and the northbound API 325).

In some implementations, when an ad-hoc or an intent-based configuration change request arrives to the network orchestrator 320 via its northbound API, the transaction manager (e.g., the transaction engine 322) initiates a new transaction object to handle the request. All read and write operations of the request go through the transaction object. The transaction object uses the data layer to fulfill the read requests. In general, the data layer first tries to serve the request from its in-memory representation (e.g., the in-memory tree 434 of FIG. 4) and if the request cannot be fulfilled it loads, on-demand, the data from the persistent storage (e.g., the disk storage 436 of FIG. 4).

When the transaction is committed, the transaction object may perform YANG validation. If the YANG validation succeeds and the transaction is accepted, the data layer and the persistent storage may be updated with the changes recorded by the transaction object, and the changes are propagated to the network via the southbound API of the network orchestrator 420.

In some implementations, a data load and off-load approach that is minimal in terms of memory requirement and is on-demand is disclosed herein. This approach can minimize the memory usage of any network orchestrator 320 without compromising its throughput characteristic. As will be discussed in more detail below, three methodologies for performing efficient data loading from persistent storage into memory are disclosed herein. The first such method includes the on-demand loading of a configuration node with one or more of its direct children into memory. The second such method includes the adaptative loading of nodes from the persistent storage by hint-based prefetching that speeds up YANG schema constraint validations. These two methodologies are then complemented by a third such method that includes parallel data loading into memory while sequentially inserting the data into the in-memory tree representation to ensure YANG schema order.

FIG. 4 illustrates another example system for management of large-scale networks that implements a read-through mechanism. As shown in FIG. 4, the system 400 includes a network management tool 432 (which may be analogous to the network management tool 332 of FIG. 3), an in-memory tree 434, and disk storage 436. In some implementations, the disk storage 436 can be a persistent memory storage, such as a hard disk, flash storage, or similar non-volatile memory device.

As shown in FIG. 4, the in-memory tree 434 can read data (e.g., data associated with an ad-hoc or an intent-based configuration change request or other data operation) from the disk storage 436. Similarly, the network management tool 432 can read data from the in-memory tree 434. Data read by the in-memory tree 434 can be read and/or offloaded by the network management tool 432. Similarly, data read by the network management tool 432 can be offloaded (e.g., by issuing, by the network management tool 432, an offload request) to the in-memory tree 434. Finally, in some implementations, the network management tool 432 can write data back to the disk storage 436.

Figure 5:
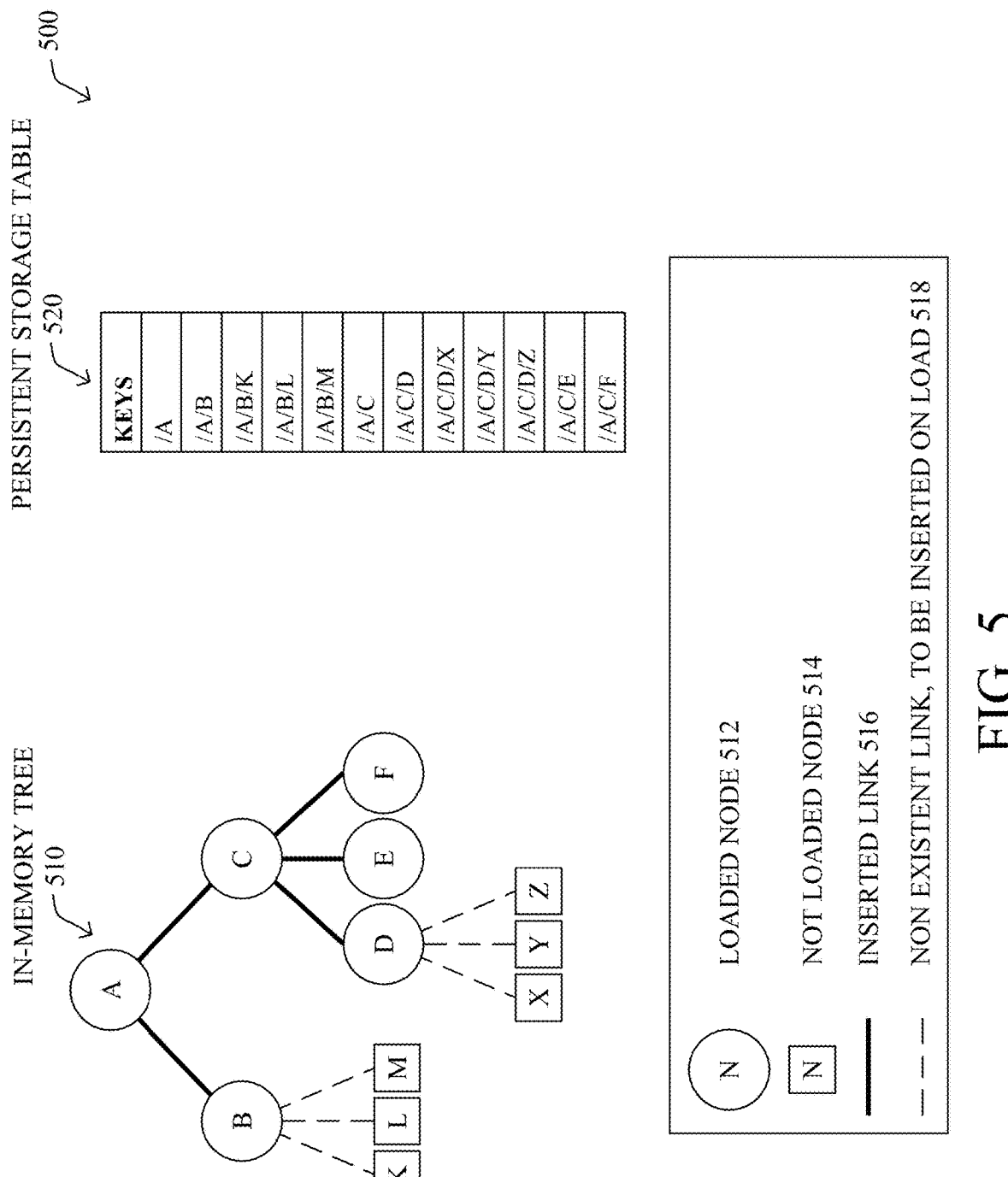
FIG. 5 illustrates an example representation of node keys in persistent storage for and, partially loaded in-memory tree for management of large-scale networks.

FIG. 5 illustrates an example representation 500 of node keys in persistent storage for and, partially loaded in-memory tree for management of large-scale networks. As shown, an in-memory tree 510 comprises loaded nodes 512 and not loaded nodes 514, where loaded nodes 512 are interconnected by inserted links 516 and the not loaded nodes 514 are shown with non-existent links 518 (to be inserted on load). Also shown is a persistent storage table 520 with a number of associated keys as shown and as discussed in further detail herein.

The general workload of a network orchestrator (e.g., the network orchestrator 320 of FIG. 3), which includes processing configuration change and retrieval requests, usually involves some level of iteration on the tree representation in the data layer. That is, processing configuration change and retrieval requests rarely involve a sole point lookup. It is noted that, in general, a "point lookup" refers to retrieving the value of a path from the persistent storage (e.g., execution of Value=Get(Path) command). This can be due to a user wanting to examine the current access control list or change some configuration parameters of a specific interface on a network device.

As a result, if the whole tree is not kept in memory, an on-demand loading solution is necessary. A naïve on-demand loading solution may involve performing point lookups on the persistent storage and directly loading the retrieved node's data into memory. However, considering the general workload of a network orchestrator, this approach may suffer from the repeated overhead of the point lookups because, for example, when modifying an interface on a network device, most data nodes are read that are below that interface.

In order to address these issues, implementations of the present disclosure allow for on-demand loading to load minimal data in batches while performing point lookups in the persistence storage (e.g., the disk storage 436 of FIG. 4). As shown in FIG. 5, when the network orchestrator performs a point lookup for a specific node, the network orchestrator also enqueues a background load for one or more of the immediate children of that specific node. Retrieval of one or more of the immediate children of the specific node in turn reduces the overhead of consequent lookups due to the storage order of a node and its children.

In some implementations, a sparse range scan on the key associated with the specific node can retrieve all (or some) immediate children in one operation. Accordingly, on-demand loading in accordance with the disclosure becomes sufficient for the general workload of a network orchestrator while reducing the overhead associated with repeated point lookups. That is, as shown in FIG. 5, the node data from the table can be partially loaded into memory to reduce the overhead associated with repeated point lookups.

As mentioned above, implementations of the present disclosure further allow for adaptive loading of nodes from the persistent storage based on hint-based prefetching that can speed up YANG schema constraint validations. As will be appreciated, YANG schema constraints express correctness requirements regarding the network device configuration. An example for YANG Schema constraints is the following: the active VLAN ID must point to an existing (e.g., a "must" expression), enabled interface (e.g., a leafref node) on the device. As mentioned above, this can be directly given as or translated to XPath expressions in the YANG modelling language.

In the event of a network configuration change, the network orchestrator can evaluate XPath expressions to perform YANG validation in response to the configuration change. Depending on the size of the network, YANG validation can be both resource consuming and time consuming. In order to speed up YANG validations, the iterations performed on large lists can be limited by ensuring that only those list instances that are relevant for a given XPath expression are checked.

Thus, in accordance with the disclosure, during YANG validation XPath expressions can be pre-compiled to list filters that are used to restrict list iterations and point lookups. In such implementations, sub-paths can be extracted based on list filters and can be used as a hint to prefetch upcoming point lookups on subtree nodes. Based on this hint, the network orchestrator can then spawn another background thread to load the subtree nodes. This prefetching can enable performance of a bulk data load in a key range, thereby avoiding expensive on-demand point lookups, and, therefore, speeding up YANG validation while minimizing the data load.

Figure 6:
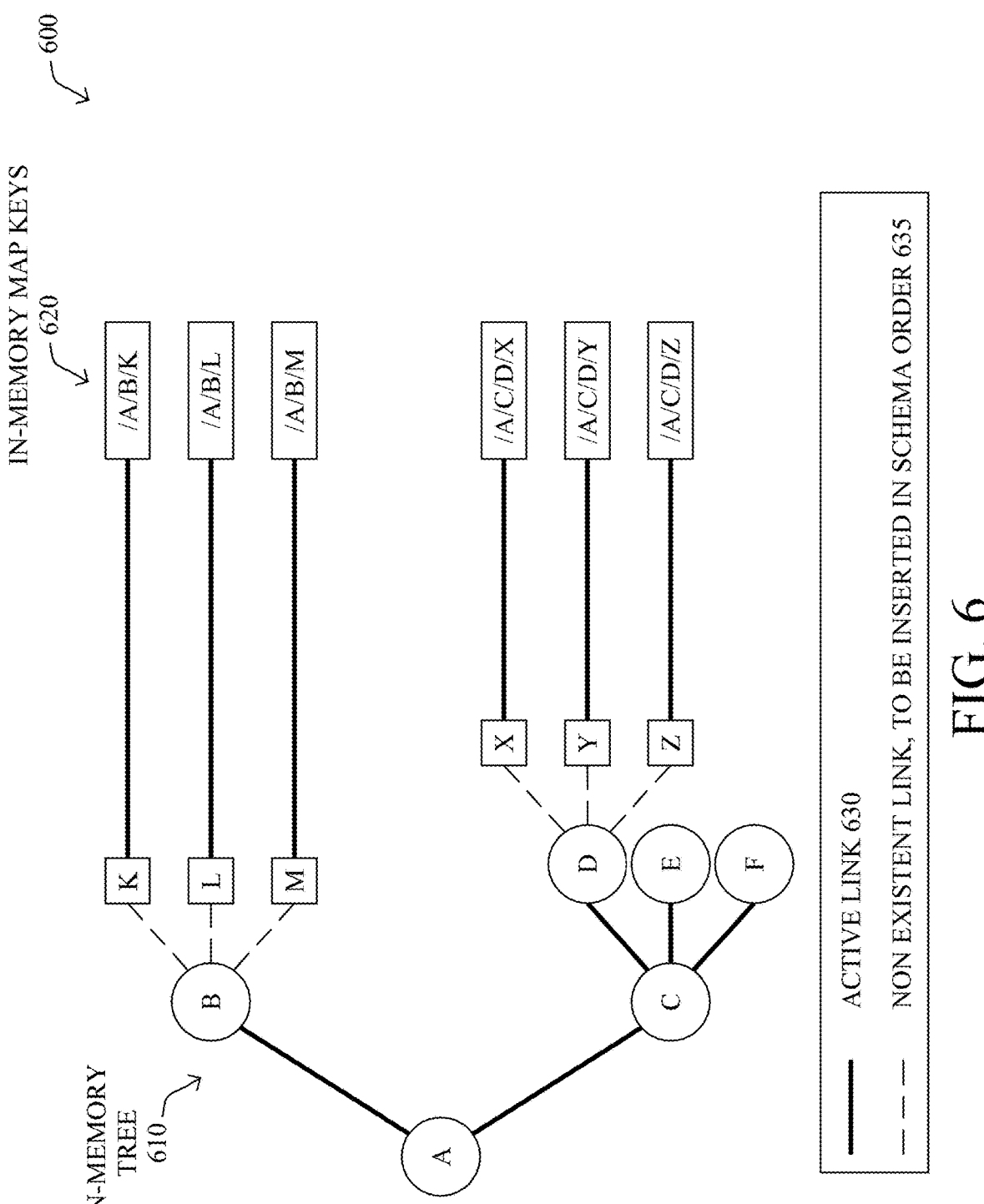
FIG. 6 illustrates an example representation of data for a set of tree nodes loaded into a memory map in parallel while the data is yet to be inserted into a partially loaded in-memory tree, for management of large-scale networks.

FIG. 6 illustrates an example representation of data for a set of tree nodes loaded into a memory map in parallel while the data is yet to be inserted into a partially loaded in-memory tree, for management of large-scale networks. In particular, as described in greater detail below, FIG. 6 illustrates an in-memory tree 610 (where all nodes are now loaded), in-memory map keys 620, and links that are either active links 630 or non-existent links 635, which are to be inserted in schema order, as described further herein.

As shown in FIG. 6, the data for tree nodes are loaded into a memory map in parallel. Links from the tree to the node data can be created dynamically at access time and in order (e.g., with their schema order maintained). When the tree links for a node are made, the map entry is removed and the data can be referenced only from the tree.

Well-formed southbound communication towards network devices and correctness of configuration changes may depend heavily on schema order (e.g., YANG schema order). As a result, respecting the order of entries in an access control list may be essential for a network to function as intended. Accordingly, implementations of the present disclosure allow for schema order to be maintained without limiting data load performance.

In such implementations, as shown in FIG. 6, the network orchestrator may load all the data read from the persistent storage into memory in background threads in parallel. The threads may then read the data into a helper data structure (e.g., a map). In some implementations, the path that defines the location of a node in the in-memory tree representation can be associated with a key corresponding to data associated with the node in this map.

At a subsequent time, when the network orchestrator accesses the node from the in-memory tree representation, the network orchestrator can cause the data from the map to be moved into the tree. In this manner, the data is loaded in parallel from the persistent storage but is inserted sequentially into the in-memory tree representation, as shown in FIG. 6. This therefore allows for schema order to be maintained by moving the in-memory data at access time.

For the sake of completeness, implementations in accordance with the disclosure further provide for data offloading in addition to on-demand data loading. In some implementations, an example data offloading methodology to maintain the memory footprint of the network (and components thereof) at or below a threshold memory consumption level is provided herein. In this non-limiting data offloading example, the data offloading may be user-defined, although implementations are not so limited and the data offloading methodologies can be pre-defined, defined by networks operators, and/or implemented in accordance with machine learning techniques, among other possibilities.

In some implementations, the network orchestrator may continuously monitor memory consumption associated with the network and components thereof and may issue a data purge involving the in-memory tree nodes when certain criteria are met. For example, the network orchestrator may issue a data purge involving the in-memory tree nodes based on the oldest access time of particular nodes when the total amount of data passes a user-defined threshold. This data purge may continue until a threshold amount of space from the memory has been freed. In such implementations, the data purge may ensure that no volatile operational data gets lost or otherwise purged.

Figure 7:
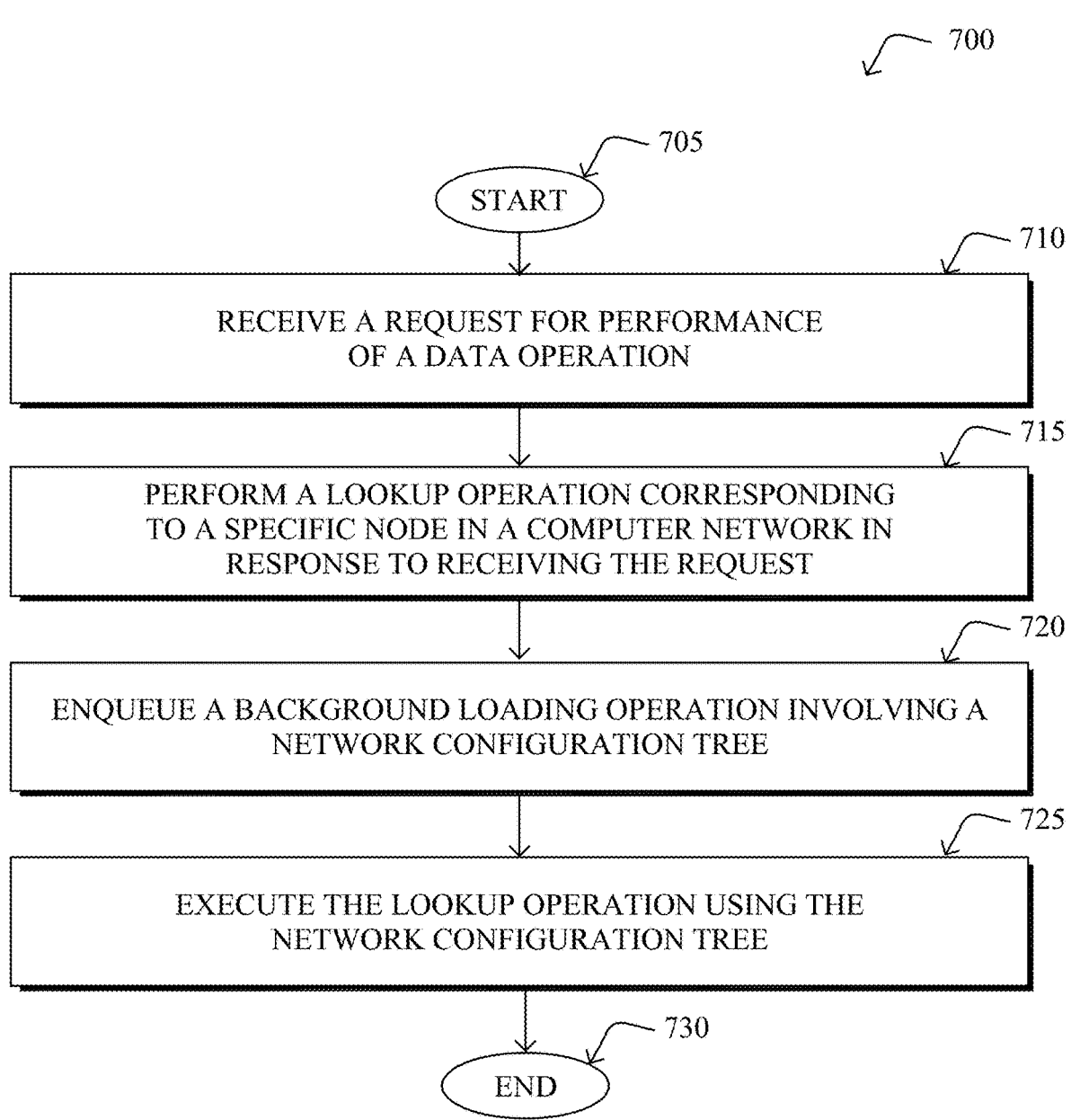
FIG. 7 illustrates an example procedure for management of large-scale networks.

In closing, FIG. 7 illustrates an example simplified procedure for management of large-scale networks in accordance with one or more embodiments described herein. For example, a non-generic, specifically configured device (e.g., device 200, an apparatus) may perform procedure 700 by executing stored instructions (e.g., process 248). The procedure 700 may start at step 705, and continues to step 710, where, as described in greater detail above, a network orchestrator (e.g., a network service orchestrator or similar combination of hardware and/or software) receives a request for a data operation (e.g., a read operation, write operation, configuration change and retrieval operation, etc.).

Procedure 700 may continue to step 715 where, as described in greater detail above, the network orchestrator performs a lookup operation corresponding to a specific data node (or "node," for brevity) in a computer network in response to receiving the request.

Procedure 700 may continue to step 720 where, as described in greater detail above, the network orchestrator enqueues a background loading operation involving a network configuration tree that includes one or more children nodes associated with the specific data node in response to initiating performance of the lookup operation. In some implementations, the background loading operation involving the network configuration tree may enqueue only immediate children nodes associated with the specific node. Further, as discussed above, in some implementations, the network configuration tree can comprise an in-memory tree (e.g., written to a memory device).

Procedure 700 may continue to step 725 where, as described in greater detail above, the network orchestrator executes the lookup operation using the network configuration tree.

In some implementations, the network orchestrator performs a sparse range scan to retrieve the network configuration tree that includes the one or more children nodes associated with the specific node.

As discussed above, the network orchestrator may evaluate a plurality of expressions to perform a validation operation involving a data model corresponding to nodes associated with the request to determine expressions among the plurality of expressions that are relevant to nodes associated with the request. In such implementations, the network orchestrator can extract sub-paths corresponding to the expressions among the plurality of expressions that are relevant to nodes associated with the request and use the sub-paths as hints to prefetch upcoming point lookups on sub-trees associated with the lookup operation. In some implementations, the plurality of expressions can comprise XPath expressions, and the data model can be constructed using a YANG data modeling language.

In some implementations, the network orchestrator can load configuration data corresponding to nodes associated with the request into a memory in background threads in parallel and map the configuration data into a helper data structure where locations of nodes in the network configuration tree are associated with corresponding nodes associated with the request in the helper data structure. In such implementations, the network orchestrator can generate links in the network configuration tree and remove entries in the helper data structure that are associated with corresponding to nodes associated with the request in response to generating the links in the network configuration tree.

As discussed above, in some implementations, the network orchestrator can cause a schema order associated with nodes associated with the request while mapping the configuration data into the helper data structure. Moreover, in some implementations, the network orchestrator can monitor memory consumption within the computer network, determine that a threshold amount of memory consumption has been reached, and issue a data purge on nodes of the network configuration tree in response to determining that the threshold amount of memory consumption has been reached.

Procedure 700 may end at step 725.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: receiving, by a network orchestrator, a request for a configuration change and retrieval; performing, by the network orchestrator, a lookup operation corresponding to a specific node in a computer network in response to receiving the request; enqueuing, by the network orchestrator, a background loading operation involving a network configuration tree that includes one or more children nodes associated with the specific node in response to initiating performance of the lookup operation; and executing, by the network orchestrator, the lookup operation using the network configuration tree.

In still other implementations, a tangible, non-transitory, computer-readable medium storing program instructions that cause a device to execute a process comprising: receiving, by a network orchestrator, a request for a configuration change and retrieval; performing, by the network orchestrator, a lookup operation corresponding to a specific node in a computer network in response to receiving the request; enqueuing, by the network orchestrator, a background loading operation involving a network configuration tree that includes one or more children nodes associated with the specific node in response to initiating performance of the lookup operation; and executing, by the network orchestrator, the lookup operation using the network configuration tree.

The techniques described herein, therefore, provide for management of large-scale networks. As discussed above, implementations of the present disclosure minimize the memory usage of a network orchestrator while ensuring correct, transactional handling of data, such as YANG modelled data. These techniques therefore allow for the memory requirements of the network orchestrator to no longer grow linearly with the network size, as is common in current approaches, thereby leading to a reduction in the energy footprint and operating costs of a network, which can, in turn, promote the adoption of "Green IT" practices.

For example, implementation of the methodologies described herein can provide an approximate speed up of five times in upstart time while reducing over 90% memory cost in booting the system. Further, memory utilization for service creation can be reduced by around 95%, thereby significantly reducing the memory requirements of a network orchestrator without compromising its throughput characteristics. This can, in turn, allow for operators of network deployments to operate smaller systems (e.g., smaller machines) that current approaches, thereby resulting in a decrease in energy and operational costs when compared to current approaches.

Illustratively, the techniques described herein may be performed by hardware, software, and/or firmware, (e.g., an "apparatus") such as in accordance with the management process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly. Also, while certain embodiments are described herein with respect to using certain models for particular purposes, the models are not limited as such and may be used for other functions, in other embodiments.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

receiving, by a network orchestrator, a request for performance of a data operation, wherein the request identifies a specific data node of a network configuration tree representing configuration data of a computer network, the configuration data stored in a persistent storage;

performing, by the network orchestrator, a lookup operation for configuration data corresponding to the specific data node the lookup operation comprising:

satisfying the lookup operation using the configuration in a partially loaded network configuration tree resident in a memory of the network orchestrator when available, and satisfying the lookup operation by retrieving the configuration data from the persistent storage for use by the partially loaded network configuration tree when the configuration data is not available in the partially loaded network configuration tree; and enqueuing, by the network orchestrator and in response to initiation of the lookup operation, a background loading operation that loads from the persistent storage configuration data for one or more children nodes associated with the specific data node into the memory of the network orchestrator for use by the partially loaded network configuration tree.

2. The method of claim 1, wherein the background loading operation is performed to enqueue only configuration data for immediate children nodes associated with the specific data node.

3. The method of claim 1, wherein the partially loaded network configuration tree comprises an in-memory tree that represents a subset of configuration data stored in persistent storage.

4. The method of claim 1, further comprising:
performing, by the network orchestrator, a range scan of the persistent storage to retrieve the configuration data for the one or more children nodes associated with the specific data node.

5. The method of claim 1, further comprising:
evaluating, by the network orchestrator, a plurality of expressions to perform a validation operation involving a data model corresponding to nodes associated with the request to determine expressions among the plurality of expressions that are relevant to nodes associated with the request;
extracting, by the network orchestrator, sub-paths corresponding to the expressions among the plurality of expressions that are relevant to nodes associated with the request; and
using the sub-paths as hints to prefetch upcoming point lookups on sub-trees associated with the lookup operation by retrieving, from the persistent storage, configuration data for the sub-trees into the memory of the network orchestrator for use by the partially loaded network configuration tree.

6. The method of claim 5, wherein:
the plurality of expressions comprise XPath expressions, and
the data model is constructed using a YANG data modeling language.

7. The method of claim 1, further comprising:
loading, by the network orchestrator, configuration data corresponding to nodes associated with the request into the memory of the network orchestrator in background threads in parallel from the persistent storage; and
mapping, by the network orchestrator, the configuration data into a helper data structure where locations of nodes in the partially loaded network configuration tree are associated with corresponding nodes associated with the request in the helper data structure.

8. The method of claim 7, further comprising:
generating, by the network orchestrator, links in the partially loaded network configuration tree; and
removing, by the network orchestrator, entries in the helper data structure that are associated with corresponding to nodes associated with the request in response to generating the links in the partially loaded network configuration tree.

9. The method of claim 7, further comprising:
ensuring, by the network orchestrator, a schema order associated with nodes associated with the request while mapping the configuration data into the helper data structure.

10. The method of claim 1, further comprising:
monitoring, by the network orchestrator, memory consumption of the memory of the network orchestrator;

determining, by the network orchestrator, that a threshold amount of the memory consumption has been reached; and
issuing, by the network orchestrator, a data purge on nodes of the partially loaded network configuration tree in response to determining that the threshold amount of memory consumption has been reached.

11. An apparatus, comprising:
one or more network interfaces to communicate with a network;
a processor coupled to the one or more network interfaces and configured to execute one or more processes; and
a memory configured to store a process that is executable by the processor, the process comprising:
receiving, by a network orchestrator, a request for performance of a data operation, wherein the request identifies a specific data node of a network configuration tree representing configuration data of a computer network, the configuration data stored in a persistent storage;
performing, by the network orchestrator, a lookup operation for configuration data corresponding to the specific data node the lookup operation comprising:
satisfying the lookup operation using the configuration in a partially loaded network configuration tree resident in a memory of the network orchestrator when available, and
satisfying the lookup operation by retrieving the configuration data from the persistent storage for use by the partially loaded network configuration tree when the configuration data is not available in the partially loaded network configuration tree; and
enqueuing, by the network orchestrator and in response to initiation of the lookup operation, a background loading operation that loads from the persistent storage configuration data for one or more children nodes associated with the specific data node into the memory of the network orchestrator for use by the partially loaded network configuration tree.

12. The apparatus of claim 11, wherein the background loading operation is performed to enqueue only configuration data for immediate children nodes associated with the specific data node.

13. The apparatus of claim 11, wherein the partially loaded network configuration tree comprises an in-memory tree that represents a subset of configuration data stored in persistent storage.

14. The apparatus of claim 11, further comprising:
performing, by the network orchestrator, a range scan of the persistent storage to retrieve the configuration data for the one or more children nodes associated with the specific data node.

15. The apparatus of claim 11, further comprising:
evaluating, by the network orchestrator, a plurality of expressions to perform a validation operation involving a data model corresponding to nodes associated with the request to determine expressions among the plurality of expressions that are relevant to nodes associated with the request;
extracting, by the network orchestrator, sub-paths corresponding to the expressions among the plurality of expressions that are relevant to nodes associated with the request; and
using the sub-paths as hints to prefetch upcoming point lookups on sub-trees associated with the lookup operation by retrieving, from the persistent storage, configuration data for the sub-trees into the memory of the network orchestrator for use by the partially loaded network configuration tree.

16. The apparatus of claim 15, wherein:

the plurality of expressions comprise XPath expressions, and the data model is constructed using a YANG data modeling language.

17. The apparatus of claim 11, further comprising:

loading, by the network orchestrator, configuration data corresponding to nodes associated with the request into the memory of the network orchestrator in background threads in parallel from the persistent storage; and mapping, by the network orchestrator, the configuration data into a helper data structure where locations of nodes in the partially loaded network configuration tree are associated with corresponding nodes associated with the request in the helper data structure.

18. The apparatus of claim 17, further comprising:

generating, by the network orchestrator, links in the partially loaded network configuration tree; and removing, by the network orchestrator, entries in the helper data structure that are associated with corresponding to nodes associated with the request in response to generating the links in the partially loaded network configuration tree.

19. The apparatus of claim 17, further comprising:

ensuring, by the network orchestrator, a schema order associated with nodes associated with the request while mapping the configuration data into the helper data structure.

20. A tangible, non-transitory, computer-readable medium storing program instructions that cause a device to execute a process comprising:

receiving, by a network orchestrator, a request for performance of a data operation, wherein the request identifies a specific data node of a network configuration tree representing configuration data of a computer network, the configuration data stored in a persistent storage;

performing, by the network orchestrator, a lookup operation for configuration data corresponding to the specific data node the lookup operation comprising:

satisfying the lookup operation using the configuration in a partially loaded network configuration tree resident in a memory of the network orchestrator when available, and satisfying the lookup operation by retrieving the configuration data from the persistent storage for use by the partially loaded network configuration tree when the configuration data is not available in the partially loaded network configuration tree; and enqueuing, by the network orchestrator and in response to initiation of the lookup operation, a background loading operation that loads from the persistent storage configuration data for one or more children nodes associated with the specific data node into the memory of the network orchestrator for use by the partially loaded network configuration tree.

* * * * *